United States Patent Office 2,775,227
Patented Dec. 25, 1956

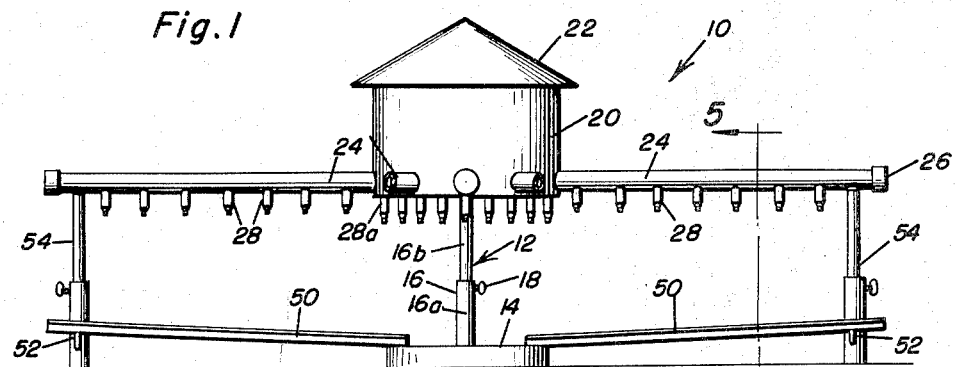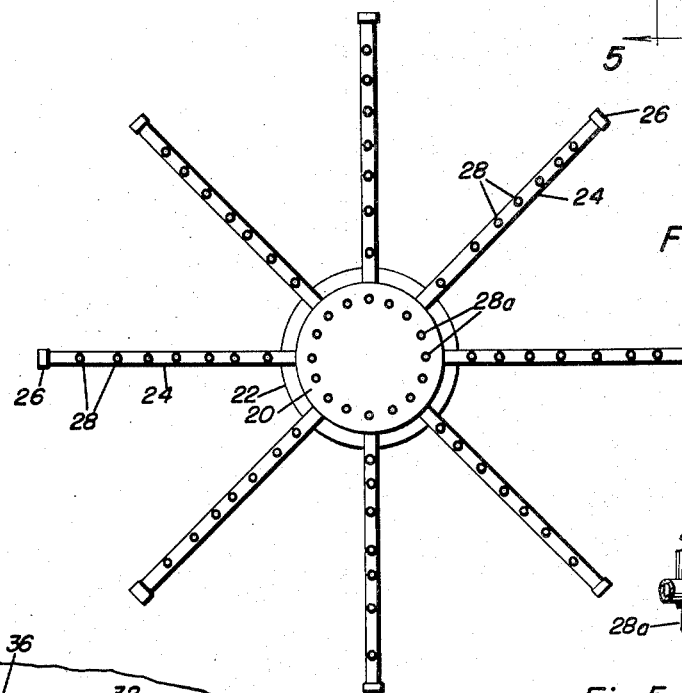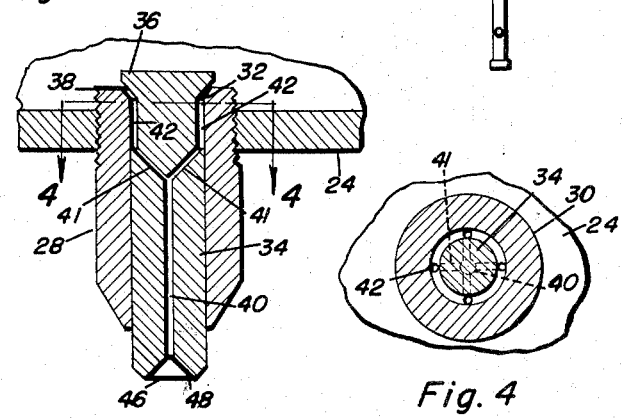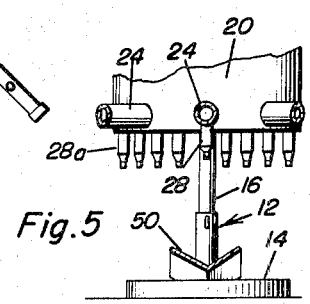
Henry Millies
INVENTOR.

2,775,227

DROP DELIVERY TYPE POULTRY FOUNTAIN

Henry Millies, Hillside, Ill.

Application September 8, 1953, Serial No. 378,865

2 Claims. (Cl. 119—72.5)

This invention relates to new and useful improvements and structural refinements in drinking fountains for poultry, or the like, and the principal object of the invention is to provide a fountain of the character herein described which is highly efficient in operation, which eliminates wastage of water and which supplies water to the poultry in a highly sanitary and effective fashion.

Specifically, the invention concerns itself with the provision of a plurality of gravity actuated dispensing valves which are carried by a set of conduits radiating from a reserve tank or reservoir, and some of the advantages of the invention reside in its simplicity of construction, in its efficient and dependable operation and in its adaptability to accommodate poultry of different sizes.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a side elevational view of the invention;

Figure 2 is an underside plan view of the reservoir, conduit and water dispensing valves used in the invention;

Figure 3 is an enlarged fragmentary sectional detail of one of the dispensing valves;

Figure 4 is a fragmentary sectional view, taken substantially in the plane of the line 4—4 in Figure 3; and Figure 5 is a sectional view, taken substantially in the plane of the line 5—5 in Figure 1.

Referring now to the accompanying drawings in detail, the poultry fountain is designated generally by the reference character 10 and embodies in its construction a supporting stand 12 including a base 14 and a slidably telescoped standard 16, the latter being readily adjustable as to height by simply loosening a wing screw 18 so that the telescoped sections 16a and 16b of the standard may be adjusted.

A suitable water reservoir 20 is mounted at the top of the standard 16 and is preferably provided with a removable cover 22 so that it may be conveniently refilled. A plurality of substantially horizontal conduits 24 radiate in all directions from the bottom portion of the reservoir 20 and are provided at the outer end thereof with suitable caps or closures 26, it being also observed that each of the conduits 24 is provided at the underside thereof with a row of water dispensing valves 28.

Additional water dispensing valves 28a may be provided at the bottom of the reservoir 20, if so desired.

The valves 28, 28a, are similar in construction, so that a description of one will suffice for all. Each of the valves consists of a substantially tubular body 30 which is provided at the upper end thereof with a beveled valve seat 32 while a valve stem 34 is slidable upwardly and downwardly in the body. The stem 34 is provided at its upper end with an enlarged head 36 having a beveled shoulder 38 which is engageable with the seat 32 when the valve stem is slid downwardly in the body. Moreover, the stem 34 is provided with an axial water passage 40 which communicates by means of branches 41 at the upper end thereof with a plurality of water passages 42, the latter being disposed immediately under the portion 38 of the head 36, as is clearly shown in Figure 3.

Accordingly, when the invention is placed in use, the valve stem 34, slid downwardly in the body 30 by the effect of gravity, causes the portion 38 of the head 36 to engage the seat 32 so that the passages 42 are closed and escape of water is prevented. However, when the birds seeking water, slide the valve stem 34 upwardly in the body 30, the portion 38 of the head 36 becomes unseated and water is permitted to escape from the conduit 24 through the passages 42, 40 for consumption by the bird.

It is to be noted that the arrangement of the passages 42, 40 is such that after the valve stem 34 is re-seated by the effect of gravity, a sufficient amount of water is present in these passages so as to form a small drop which adheres to the lower end 46 of the stem 34 and attracts attention of the bird. This adhesion of the water drop is facilitated by the formation of a frusto-conical recess 48 at the lower end of the passage 40, as is shown in Figure 3.

Any surplus water, such as may drop from the valves 28, is caught in a set of drain troughs 50 which are substantially V-shaped in cross section and are disposed under the respective conduits 24.

The inner ends of the troughs 50 simply rest upon the base 14 of the stand 12, while the outer ends of the troughs are supported by brackets 52 which project laterally from vertically adjustable, slidably telescoped stands 54 which are similar in construction to the aforementioned stand 12. The stands 54, as is best shown in Figure 1, also serve to support the outer ends of the conduits 24 and may be raised or lowered simultaneously with the stand 12, when the apparatus is to be adjusted to accommodate poultry of different types.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. In a fountain for poultry, or the like, the combination of a substantially horizontal conduit, and a water dispensing valve provided at the underside of said conduit, said valve comprising a substantially tubular body having upper and lower ends, a valve seat provided in the upper end portion of said body, and a gravity actuated valve stem slidable in said body, said valve stem being provided with water passages and having an enlarged head engageable with said seat, said passages being closed by said body when said head is engaged with said seat, said body having a concave constantly open lower end facilitating the formation of drops of water therein from water dripping from said passages when said head is engaged with said seat.

2. A fountain for poultry, or the like, comprising in combination, a water reservoir, a plurality of horizontal conduits connected to and radiating from said reservoir, rows of tubular bodies depending from said conduits and having upper ends providing seats, and downwardly slidable gravity-actuated stems in said body having water passages therein and enlarged heads engaging said seats, said passages being closed by said bodies when said heads are engaged with said seats, said bodies having concave constantly open lower ends facilitating the formation of drops of water therein from water dripping from said passages after said heads are engaged with said seats, and telescopic standards supporting said reservoir and the outer ends of the conduits for uniform vertical adjustment of the reservoir and conduits.

References Cited in the file of this patent

UNITED STATES PATENTS

| | | |
|---|---|---|
| 1,094,755 | Smith | Apr. 28, 1914 |
| 1,454,284 | Holmes | May 8, 1923 |
| 1,903,767 | Karst | Apr. 18, 1933 |
| 1,912,530 | Kubler | June 6, 1933 |
| 1,918,566 | Sadleir | July 18, 1933 |
| 2,193,258 | Shaw et al. | Mar. 12, 1940 |
| 2,486,729 | Beckley | Nov. 1, 1949 |
| 2,614,531 | Futterer | Oct. 21, 1952 |

FOREIGN PATENTS

| | | |
|---|---|---|
| 243,567 | Great Britain | Dec. 3, 1925 |